US012403576B2

(12) United States Patent
Wierzchon et al.

(10) Patent No.: US 12,403,576 B2
(45) Date of Patent: Sep. 2, 2025

(54) JAM SHOCK RELIEF MECHANISM FOR GAS SPRING FASTENING TOOL

(71) Applicant: Robert Bosch GmbH, Stuttgart (DE)

(72) Inventors: Peter Wierzchon, Morton Grove, IL (US); Craig Barrett, Schaumburg, IL (US)

( * ) Notice: Subject to any disclaimer, the term of this patent is extended or adjusted under 35 U.S.C. 154(b) by 6 days.

(21) Appl. No.: 18/536,723

(22) Filed: Dec. 12, 2023

(65) Prior Publication Data

US 2025/0187159 A1 Jun. 12, 2025

(51) Int. Cl.
*B25C 1/06* (2006.01)
*B25C 1/04* (2006.01)

(52) U.S. Cl.
CPC ................ *B25C 1/047* (2013.01); *B25C 1/06* (2013.01)

(58) Field of Classification Search
CPC ............... B25D 1/04; B25D 1/08; B25D 1/00
See application file for complete search history.

(56) References Cited

U.S. PATENT DOCUMENTS 3,094,043 A 6/1963 Powers et al.
3,434,643 A 3/1969 Wandel
8,011,547 B2 9/2011 Leimbach et al.
11,198,211 B2 12/2021 Umino et al.
11,338,421 B2 5/2022 Po
11,559,876 B2 * 1/2023 Po ............................ B25C 1/06
2007/0034663 A1 2/2007 Wey
2018/0126528 A1 * 5/2018 Pomeroy ................... B25C 5/13
2018/0133877 A1 5/2018 Ueda
2019/0126452 A1 * 5/2019 Po ........................... B25C 1/042
2020/0114500 A1 4/2020 Bierdeman et al.
2020/0346333 A1 * 11/2020 Po ............................ B25C 1/04
2021/0031350 A1 * 2/2021 Po ........................... B25C 1/008
2023/0081812 A1 * 3/2023 Tam ........................ B25C 1/047 227/130

FOREIGN PATENT DOCUMENTS

CN 109982813 7/2022

* cited by examiner

*Primary Examiner* — Nathaniel C Chukwurah
(74) *Attorney, Agent, or Firm* — Kelly McGlashen

(57) ABSTRACT

A power tool includes an air spring cylinder, a piston movably positioned within the air spring cylinder along a longitudinal axis of the air spring cylinder and a driver blade fixedly attached to the piston. The power tool includes a lifter that is attached to the piston via an elastic member so as to extend side by side with the driver blade. The elastic member serves as a jam bumper that absorbs jam shock due to abnormal tool operation.

15 Claims, 12 Drawing Sheets

FIG. 4
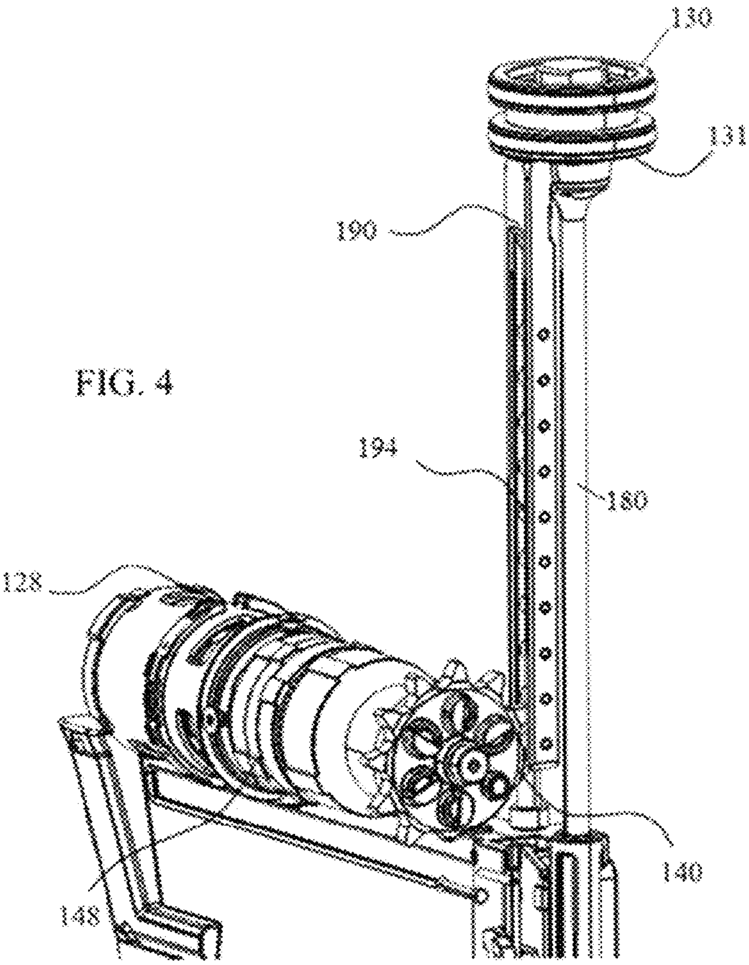
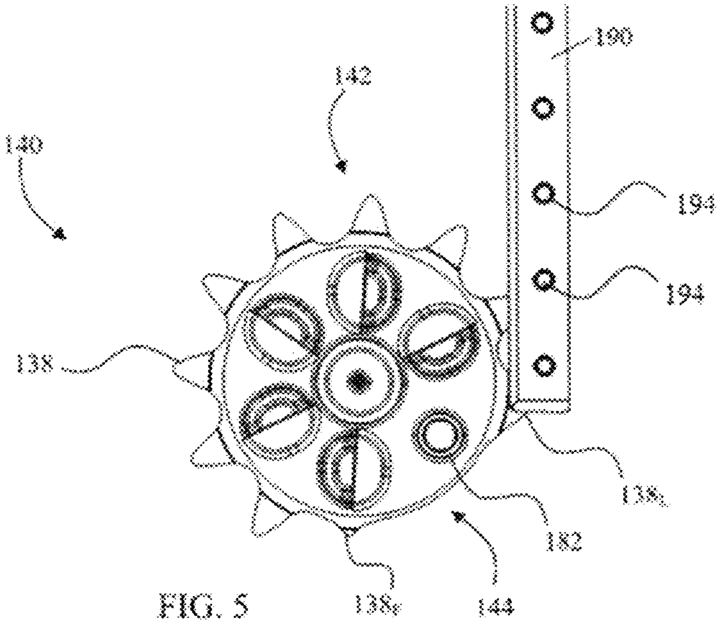
FIG. 5

JAM SHOCK RELIEF MECHANISM FOR GAS SPRING FASTENING TOOL

FIELD

The present disclosure relates generally to a power tool, and more particularly to a torque protection mechanism for a power tool incorporating an air spring.

BACKGROUND

A nail gun (nailer) is a tool which uses sudden application of a force to drive a nail or other fastener into a workpiece. A variety of mechanisms have been developed to supply the required force including the so-called "air spring". An air spring uses the compressibility of gas, which may be air, nitrogen, etc., (herein referred to simply as "air") to store energy which is released to forcefully move a driver which in turn forces the fastener into a workpiece. In particular, a motor is used to force a piston to compress the air within a cylinder. When a user presses a trigger on the nailer, the piston is released and the compressed gas forces the piston to move rapidly along a working axis of the nailer. A driver attached to the piston is thus driven into a fastener thereby driving the fastener into the workpiece.

In many air spring applications, a rack and pinion arrangement is used to compress and release the piston. In these devices a motor drives a pinion gear, and the pinion gear includes teeth extending from the periphery of the pinion gear which engage a rack fixed to the piston thereby forcing the piston to compress the gas. In order to release the piston, a portion of the pinion gear has a "tooth gap" wherein no teeth are provided along the periphery of the pinion gear. Consequently, when a user presses the trigger of the nailer with the pinion gear's last tooth before the tooth gap engaged with the rack, the motor rotates the pinion gear to a position at which the teeth of the pinion gear no longer engage the rack, allowing the pressure of the gas in the cylinder to move the piston along the working axis.

This type of device is typically configured such that once the pinion gear is rotated by the motor to allow the piston to be moved by the compressed gas, the motor simply continues to rotate the pinion gear for one complete rotation of the pinion gear. Accordingly, the tooth gap of the pinion gear is selected such that the rack is engaged by a first tooth of the pinion gear only after the piston has completed its travel along the working axis. The continued rotation of the motor for one revolution of the pinion gear then drives the piston in the opposite direction along the working axis until the last tooth of the pinion gear before the tooth gap is engaged with the rack thereby compressing the gas with the piston. Thus, the pinion gear is moved in one complete rotation from the initiation of the sequence (pressing of the trigger) until the system is ready for the next pressing of the trigger.

The above-described configuration works very well under normal operating conditions. Problems arrive, however, if the driver/piston do not travel to the designed extent along the working axis under the power of the compressed gas. Such situations can occur, for example, if a nail becomes jammed. In such situations, the motor continues to turn and the pinion gear is rotated for one complete turn. Because the piston is not fully extended along the working axis, however, as the first tooth of the pinion gear is rotated into contact with the rack, the tooth engages the rack at a midpoint of the rack rather than at the end of the rack. Consequently, the piston is fully retracted before the pinion gear has completed one full revolution.

Even though the piston is fully retracted in these situations before one complete rotation of the pinion gear, the motor continues to turn forcing the pinion gear toward a full rotation. The continued rotation of the motor forces the pinion gear teeth to momentarily disengage. Upon the disengagement, the compressed air in the cylinder forces the piston (and hence the rack) along the working axis. At the same time the motor rotates another tooth of the pinion gear into engagement with the rack which is now moving, resulting in a forceful impact between the pinion gear and the rack. Depending upon how much of the piston stroke was initially truncated, this can result in multiple shocks as the pinion gear is rotated until the pinion gear has completed one full rotation and the last tooth of the pinion gear is impacted by the rack.

The forceful collision(s) of the pinion gear and the rack is not only disconcerting to a user, it also creates a torsional shock load which propagates along the drive path from the pinion gear into drive gear of the nailer. The shock load, also referred to as a "jam shock", can lead to stress fractures within the main drive/gearing of the nailer resulting in catastrophic failure. While it is possible to provide materials which can withstand jam shock, such materials tend to be heavy which increases the weight of the portable tool which is undesired in a portable tool.

Therefore, there is a need to reduce and/or eliminate the shock load of air spring systems.

SUMMARY

One approach for providing a torque protection mechanism for a power tool incorporating an air spring is to provide a shock dampening device in the load path of the power tool that absorbs shock loads such as occur during a nail jam event during power tool use. The effectiveness of this approach is dependent upon where the shock dampening device is positioned within the power tool. In the power tool described and claimed herein, a shock dampening device (e.g., a jam bumper) is positioned within the tool at a location in which in the load path is made as short as possible, whereby the shock load on the components of the tool is reduced and/or eliminated. In particular, the jam bumper is disposed between the lifter and the piston.

By locating the jam bumper between the lifter and the piston, when a jam shock occurs, the piston force is not transmitted to the rack teeth, the lifter gear, or into gears of the gearbox and the gearbox housing.

In some aspects, a power tool includes an air spring cylinder and a piston movably positioned within the air spring cylinder along a longitudinal axis of the air spring cylinder. The power tool includes a driver blade fixedly attached to the piston, a lifter that is attached to the piston via an elastic member and a lifter gear. The lifter gear includes a lifter gear wheel portion and a plurality of teeth that extend radially from the lifter gear wheel portion and are configured to engage the lifter. The power tool includes a motor including a motor output and a hub. The hub includes a first end operably connected to the motor output and a second end including a hub wheel portion that is fixed to the lifter gear whereby the motor is configured to lift the lifter via the lifter gear.

In some embodiments, the elastic member is disposed between the lifter and the piston.

In some embodiments, the elastic member is annular and is disposed in an annular groove provided in a lifter-facing surface of the piston.

In some embodiments, a first end of the driver blade is fixed to the piston and the elastic member encircles the first end of the driver blade.

In some embodiments, a first end of the lifter is in direct contact with the elastic member.

In some embodiments, an end face of the piston includes a hole, a first end of the driver blade is received within the hole, the elastic member is annular, and the elastic member is disposed in an annular channel that surrounds the blind hole.

In some embodiments, a first end of the lifter has an annular shape that defines a central opening, the central opening encircles the first end of the driver blade, and the first end of the lifter is in direct contact with the elastic member.

In some embodiments, the elastic member has surface features configured to tune the elastic properties of the elastic member.

In some embodiments, a lifter first end is in direct contact with the elastic member and a lifter second end is opposite the first end. The lifter has a lifter first portion that includes the first end, the lifter first portion having a lifter central opening that receives the driver blade therein. In addition, the lifter has a lifter second portion that includes the lifter second end, the lifter second portion being configured to engage with the teeth of the lifter gear.

In some embodiments, the lifter first portion is annular in shape and resides in a plane that is perpendicular to the longitudinal axis of the air spring cylinder.

In some embodiments, the lifter second portion includes a plurality of rollers, the rollers being spaced apart along a longitudinal axis of the lifter.

In some embodiments, the lifter second portion includes a plurality of lifter teeth, the lifter teeth being spaced apart along a longitudinal axis of the lifter.

In some embodiments, the power tool includes a stop bumper that is disposed between the piston and an end of the cylinder, the stop bumper including a stop bumper central opening. The lifter and blade extend through the stop bumper central opening.

In some embodiments, the elastic member is supported by the piston and the lifter includes a lifter first end that is in direct contact with the elastic member. A profile of the lifter first end has a shape and dimensions corresponding to the shape and dimensions of a profile of the elastic member.

In some embodiments, the lifter is placed directly adjacent to the driver blade, allowing for compact packing of nailer components and also allows use of an impact or main bumper having a constant or uniform cross-sectional shape.

As higher kinetic energies are desired by nailer users, larger pistons diameters create larger jam forces, but optimizing lifter profiles and shortening the mechanical jam shock load path with a compressible jam elastomer, as described herein, creates a lighter, better performing nail drive mechanism.

BRIEF DESCRIPTION OF THE DRAWINGS

FIG. 4 is a perspective view of the lifter, piston, lifter gear, planetary gearbox, and motor of the power tool of FIG. 1.

FIG. 5 is a front plan view of the lifter gear and a portion of the lifter of the power tool of FIG. 1 with the last tooth of the lifter gear engaged with the lifter.

DESCRIPTION

Figure 1:
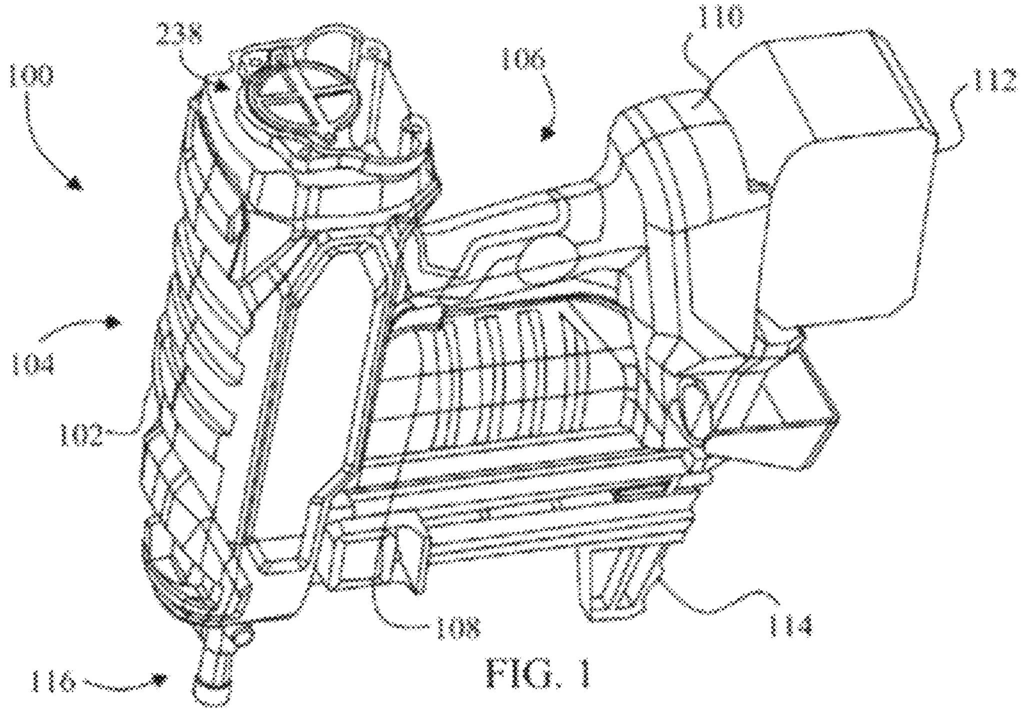
FIG. 1 is a perspective view of a power tool of the present disclosure with the cap removed and the housing partially removed to show a head valve assembly.

For the purpose of promoting an understanding of the principles of the disclosure, reference will now be made to the embodiments illustrated in the drawings and described in the following written description. It is to be understood that no limitation to the scope of the disclosure is thereby intended. It is further to be understood that the present disclosure includes any alterations and modifications to the illustrated embodiments and includes further applications of the principles of the disclosure as would normally occur to one skilled in the art to which this disclosure pertains.

Referring to FIG. 1, there is depicted a power tool 100 with an air spring as described below. The power tool in the embodiment of FIG. 1 is a nailer 100. The nailer 100 includes a housing 102 that defines a drive section 104 and a grip section 106. A trigger 108 is provided in the grip section 106 and a battery receptacle 110 is configured to removably couple with a battery 112 at the grip section 106. In other embodiments, the power tool is a corded tool. The nailer further includes a removable nail magazine 114. A work contact element (WCE) assembly 116 extends out of the housing 102.

Figure 2:
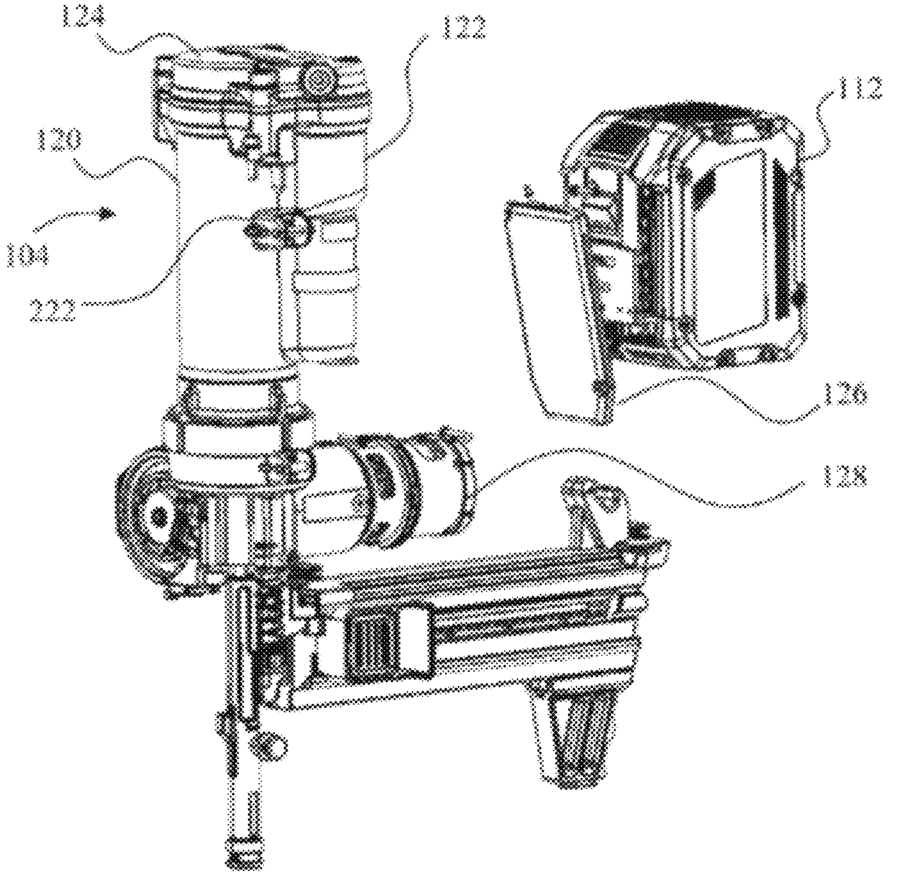
FIG. 2 is a perspective view of some components of the power tool of FIG. 1 with the housing removed.

As shown in FIG. 2, within the drive section 104 a cylinder 120 and accumulator 122 are provided. A cap 124 is used to seal the cylinder 120 and the accumulator 122 and defines a headspace 118 above the cylinder 120 and the accumulator 122 (see FIG. 3). A PCBA 126 is operably connected to the trigger 108, the battery 112, and a DC brushless motor 128.

With reference to FIGS. 3-6, a piston 130 is provided within the cylinder 120. The piston 130 is disposed in the cylinder 120 so as to translate along the cylinder longitudinal axis 226, also referred to as the drive axis 226. The piston 130 is prevented from exiting the cylinder second end 123 via an annular, stationary stop bumper 125. The stop bumper 125 is formed of an elastomeric material and is disposed adjacent the cylinder second end 123.

A driver blade 180 is fixedly attached to the piston 130. A lifter 190 extends side-by-side with the driver blade 180 and is connected to the piston 130 via a jam bumper 200, as discussed in detail below. The lifter 190 includes a number of rollers 194 which are configured to be engaged by teeth 138 of a lifter gear 140. As shown more clearly in the simplified depiction of FIG. 5, the lifter gear 140, which functions as a pinion gear, includes a toothed section 142 and a tooth gap section 144. The tooth gap section 144 is bounded by a first tooth 138F and a last tooth 138L.

The lifter gear 140 is operably connected to the motor 128 through a hub 146 (see FIG. 6) and a planetary gearbox 148 (see FIG. 4). The hub 146 is supported by a one-way needle bearing clutch 150. The hub 146 includes a geared motor side end portion 160 which is operably connected to the planetary gearbox 148. A body portion 162 of the hub 146 is fixedly connected to an inner race of the one-way needle bearing clutch 150 which is not shown herein in further detail. The body portion 162 is oversized to provide for increased torque capacity with the one-way needle bearing clutch 150. A wheel portion 164 is positioned at the non-motor facing side of the hub 146. A central bore 166 extends inwardly from the wheel portion 164 into the body portion 162. The central bore 166 is provided not only for coupling with the lifter gear 140 as described below, but also to reduce the weight of the hub 146.

The lifter gear 140 further includes a shaft 154 with an internal bore 156 which lightens the weight of the lifter gear 140. The shaft 154 is aligned with the central bore 166 and received in the central bore 166. The lifter gear 140 is secured to the hub wheel portion 164 via bolts 152. Consequently, the shaft 154 of the lifter gear 140 is maintained within the central bore 166 thereby aligning the hub 146 and the lifter gear 140.

Figure 3:
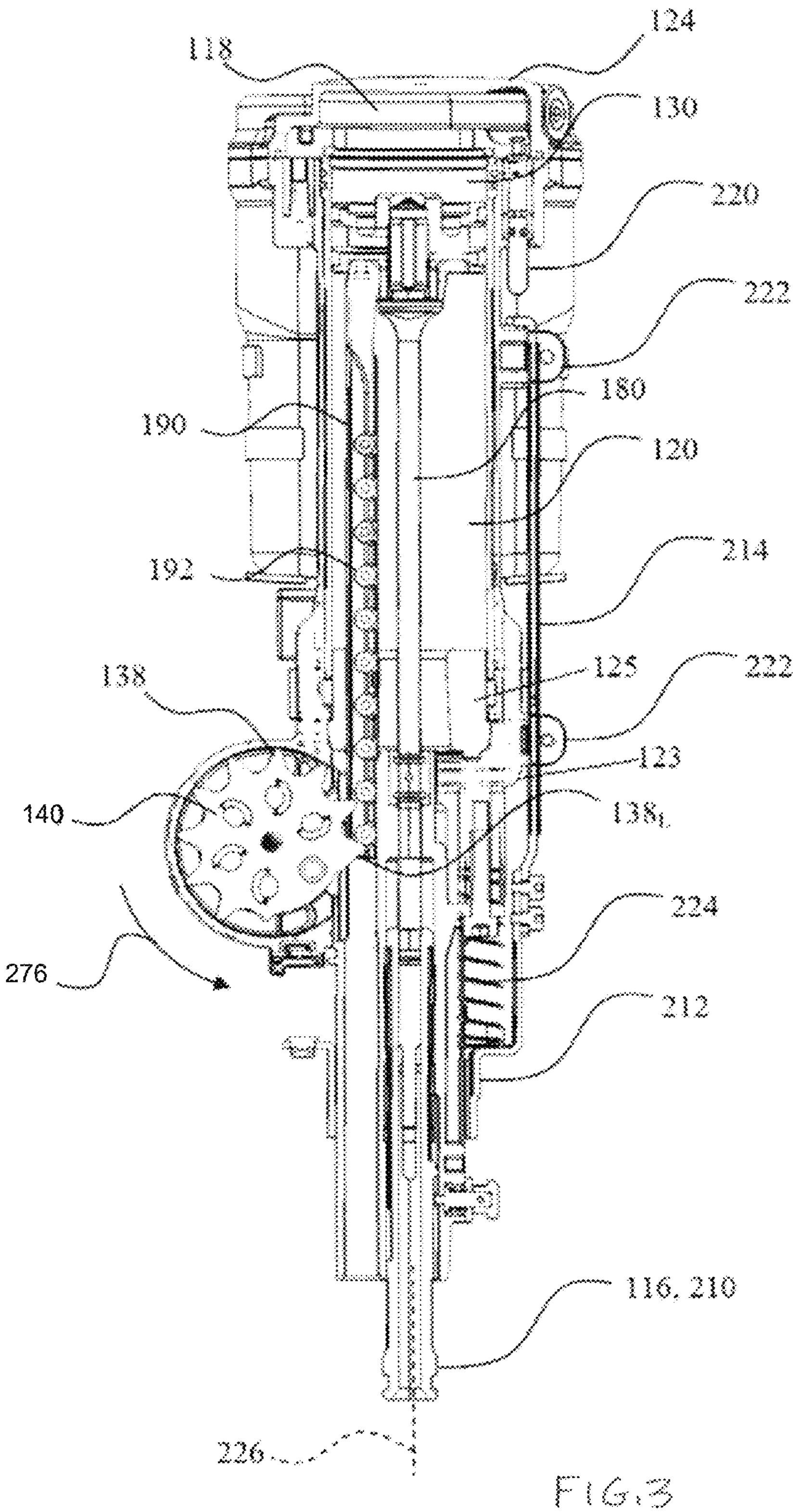
FIG. 3 is a front plan view in partial cross-section of an air spring, lifter gear, lifter, driver blade and piston of the power tool of FIG. 1.
Figure 6:
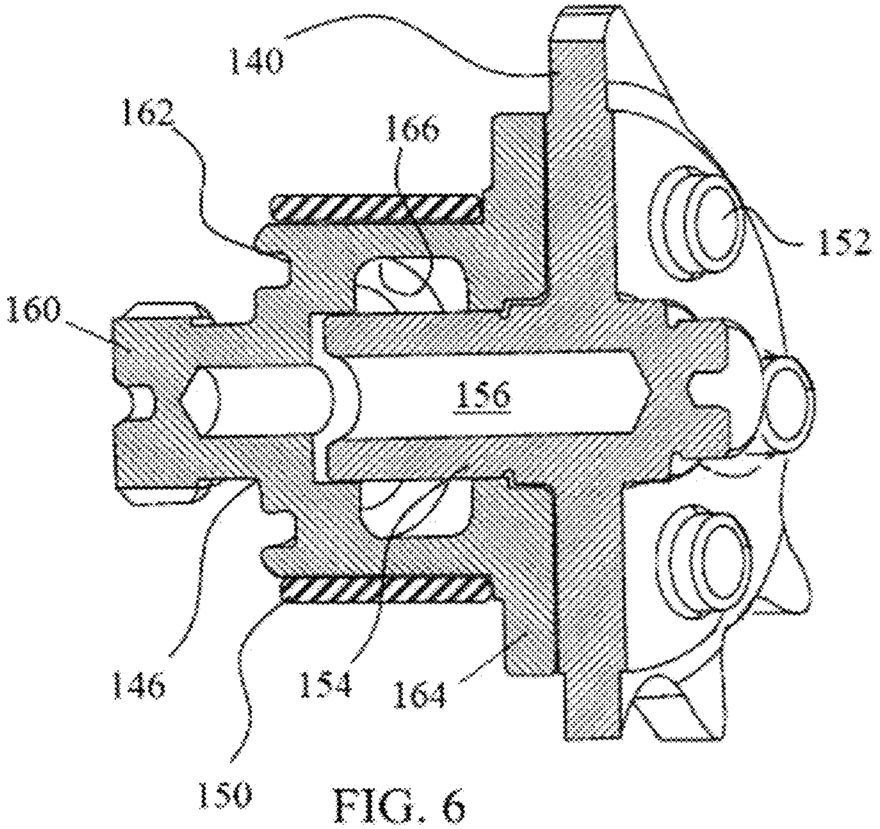
FIG. 6 is a side cross-sectional view of the hub and lifter gear of the power tool of FIG. 1.
Figure 7:
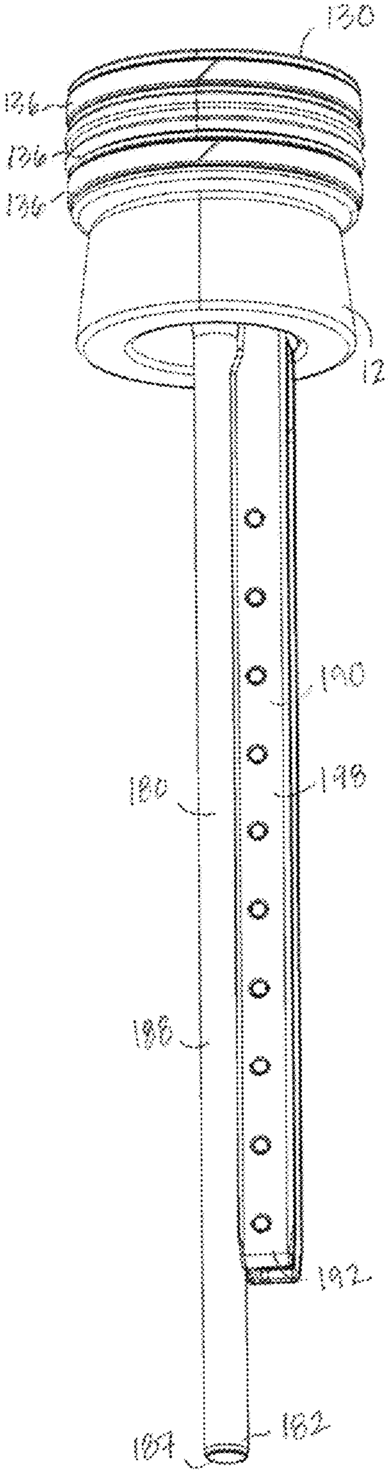
FIG. 7 is a perspective view of the assembled piston, driver blade, lifter, jam bumper and impact bumper.
Figure 8:
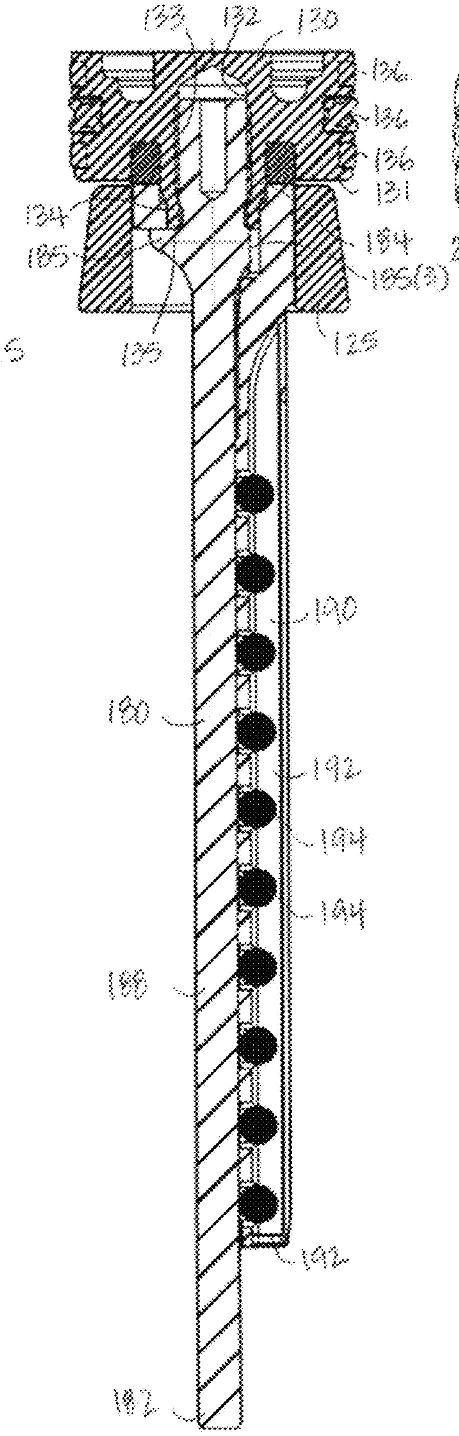
FIG. 8 is a cross-sectional view of the assembled piston, driver blade, lifter, jam bumper and impact bumper of FIG. 7.
Figure 9:
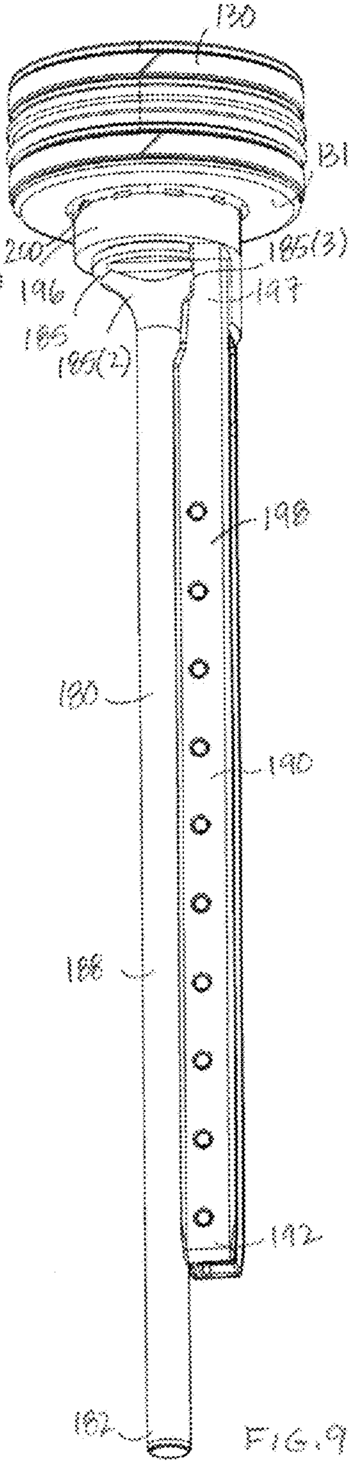
FIG. 9 is a perspective view of the assembled piston, driver blade, lifter and jam bumper with the impact bumper omitted to permit visualization of the jam bumper.

Referring to FIGS. 3 and 7-8, the nailer 100 includes a fastener driver mechanism. The fastener driver mechanism includes the driver blade 180, the cylinder 120 and the piston 130. The piston 130 includes several seals 136 that engage and form a fluid tight seal with an inner surface of the cylinder 120.

The piston 130 includes a central blind hole 132 provided in the piston lifter-facing surface 131 (e.g., the surface of the piston 130 that faces away from the cap 124), and a protruding annular boss 134 surrounds the blind hole 132. The inner surface of the blind hole 132 includes an internal thread 133. The boss 134 has a non-uniform inner diameter so that a terminal end 135 of the boss 134 has a smaller inner diameter than does the blind hole 132.

The piston 130 includes an annular recess 137 that surrounds the boss 134. The recess 137 is shaped and dimensioned to receive a portion of the jam bumper 200 therein. In the illustrated embodiment, the recess 137 has a rectangular cross-sectional shape and receives the jam bumper 200 in a slip fit or press fit.

Referring to FIGS. 7-9, 12 and 16, the driver blade 180 is fixed to the piston 130 so as to protrude from the piston lifter-facing surface 131 and serves as the portion of the fastener driver mechanism that contacts a fastener and drives the fastener into a workpiece. The driver blade 180 is an elongate, solid cylindrical rod having a blade first end 181 that is joined to the piston 130 via, for example, a threaded connection, and a blade second end 182 that is opposed to the blade first end 181. The driver blade 180 includes a blade longitudinal axis 183 that extends between the blade first and second ends 181, 182, and is co-linear with the cylinder longitudinal axis 226.

The driver blade 180 has a circular cross-section and a diameter that varies along the blade longitudinal axis 183. In particular, the driver blade 180 includes a blade first portion 186 that includes the blade first end 181 and has a blade first diameter d1, and a blade second portion 188 that includes the blade second end 182 and has a blade second diameter d2 that is smaller than the blade first diameter d1.

The driver blade includes an integrally-formed annular protrusion 185 at the transition between the blade first and second portions 186, 188. The diameter d3 of the annular protrusion 185 is greater than the blade first diameter d1. A shoulder 185(1) is formed at the intersection of the blade first portion 186 and the annular protrusion 185, whereas the transition 185(2) between the annular protrusion 185 and the blade second portion 188 is smoothly curved. The annular protrusion 185 is truncated on one side of the blade longitudinal axis 183, providing a discontinuity 185(3) in the periphery of the annular protrusion 185.

The blade first portion 186 includes a circumferentially-extending groove 189 that adjoins the shoulder 185(1) of the annular protrusion 185. The groove 189 is configured to receive the terminal end 135 of the boss 134 that protrudes from the piston lifter-facing surface 131.

The blade first end 181 includes an external thread 184 (shown in FIG. 8) that engages with a corresponding internal thread 133 provided on the inner surface of the piston blind hole 132. The blade external thread 184 terminates at groove 189. The shoulder 185(1) abuts the piston boss 134 when the driver blade 180 is fully engaged with, and secured to, the piston 130. Since the driver blade 180 is on the same axis 183 as the piston centerline axis 121 and since the driver blade 180 is rigidly coupled to the piston 130, the maximum impact energy is permitted to be delivered to the fastener during a driving operation of the tool 100.

The blade second end 182 terminates in a blunt tip 187 that is perpendicular to the blade longitudinal axis 183 and provides a fastener contact surface during a driving operation of the tool 100.

The driver blade 180 is configured, for example via conventional forming and treating processes, to accommodate the frequent, high-load impacts associated with driving fasteners into substrates (such as wood, concrete, etc.) having a range of hardnesses.

Referring to FIGS. 3, 8-9 and 16, the lifter 190 is part of a lift mechanism that returns piston 130 and the driver blade 180 to a position in the cylinder 120 in which the air in the cylinder is compressed and the nailer is ready to drive a fastener. The lift mechanism also includes the lifter gear 140, the hub 146, the planetary gearbox 148 and the motor 128.

Like the driver blade 180, the lifter 190 is attached to the piston 130. Unlike the driver blade 180, the lifter 190 is not fixed relative to the piston 130. Instead, the lifter 190 is connected to the piston 130 via a jam bumper 200, described in detail below. The jam bumper 200 permits the lifter 190 to move a limited amount in the axial direction of the driver blade 180 (e.g., a limited amount in a direction parallel to the driver blade longitudinal axis 183).

The lifter 190 is connected to the piston 130 through the jam bumper 200 so as to protrude from the piston lifter-facing surface 131. The lifter 190 serves as the portion of the lift mechanism that engages with the lifter gear 140 and drives the piston 130 axially within the cylinder 120. The lifter 190 is an elongate structure that extends side-by-side with the driver blade 180. The lifter 190 has a lifter first end 191 that is joined to the jam bumper 200, and a lifter second end 192 that is opposed to the lifter first end 191. The lifter 190 includes a lifter longitudinal axis 193 that extends between the lifter first and second ends 191, 192. The lifter longitudinal axis 193 is parallel to, and radially offset with respect to, the blade longitudinal axis 183.

The lifter 190 has a cross-sectional shape and a dimension that varies along the lifter longitudinal axis 193. In particular, the lifter 190 includes a lifter first portion 196 that includes the lifter first end 191 and defines an annular body 195 that encircles the driver blade first end 181 and the piston boss 134. The annular body 195 resides in a plane that is perpendicular to the cylinder longitudinal axis 226 and lifter longitudinal axis 193, and a central opening 195(1) of the annular body 195 is centered on the cylinder longitudinal axis 226. The lifter 190 includes an elongated lifter second portion 198 that includes the lifter second end 192. The lifter second portion 198 is coextensive with the lifter longitudinal axis 193. The lifter second portion 198 defines a ladder structure in which the rungs of the ladder correspond to pivot pins of the rollers 194. The lifter 190 includes a bridging portion 197 that extends between the lifter first and second portions 196, 198.

The jam bumper 200 is an annular structure formed of an elastomer such as polyurethane or rubber. The jam bumper 200 has a cap-facing surface 201 and a lifter-facing surface 202 that is opposite the cap-facing surface 201. The jam bumper 200 has an outer peripheral edge 203 and an inner peripheral edge 204, the inner peripheral edge 204 defining a central opening 205. The inner diameter d4 (e.g., the diameter of the central opening 205) is large relative to the outer diameter d5 and the ratio of inner diameter d4 to outer diameter d5 is determined by the requirements of the specific application. In the illustrated embodiment, for example, the ratio of inner diameter d4 to outer diameter d5 is 0.6. The jam bumper 200 has a rectangular cross-sectional shape. In the illustrated embodiment, the axial dimension of the jam bumper 200 cross-section is slightly greater than the radial dimension.

Figure 10:
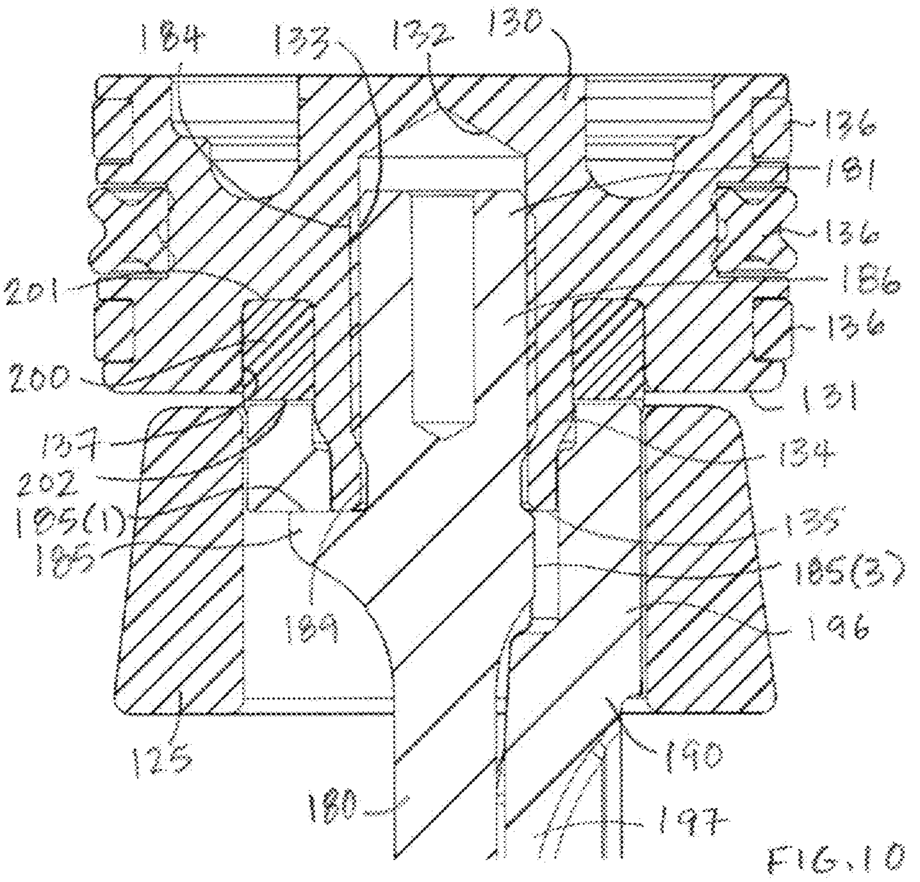
FIG. 10 is an enlargement of a portion of the cross-sectional view of FIG. 8, showing the jam bumper configuration during normal operation of the tool.

In the illustrated embodiment, the axial dimension of the jam bumper 200 is sufficient to permit the jam bumper lifter-facing surface 202 to reside outside the recess 137 of the piston 130 (e.g., the lifter-facing surface 202 stands proud relative to the lifter-facing surface 131 of the piston) when the jam bumper is in an unloaded state (FIG. 10). The unloaded state occurs, for example, during normal operation of the nailer 100.

Figure 11:
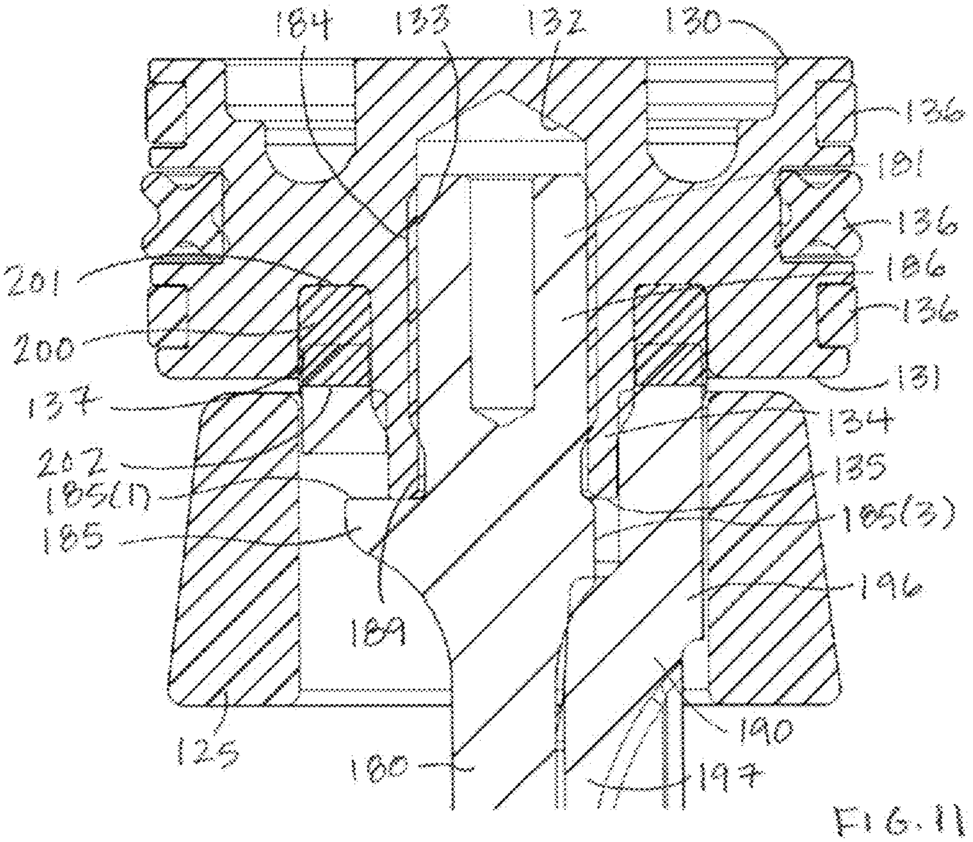
FIG. 11 is an enlargement of a portion of the cross-sectional view of FIG. 8, showing the jam bumper configuration under a jam shock load as occurs during a nail jam event.
Figure 12:
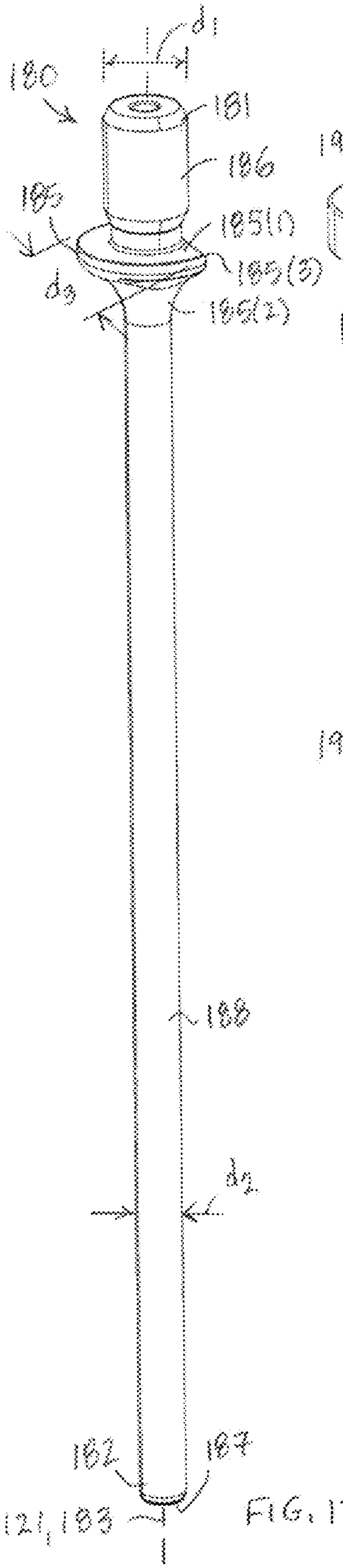
FIG. 12 is a perspective view of the drive blade.
Figure 13:
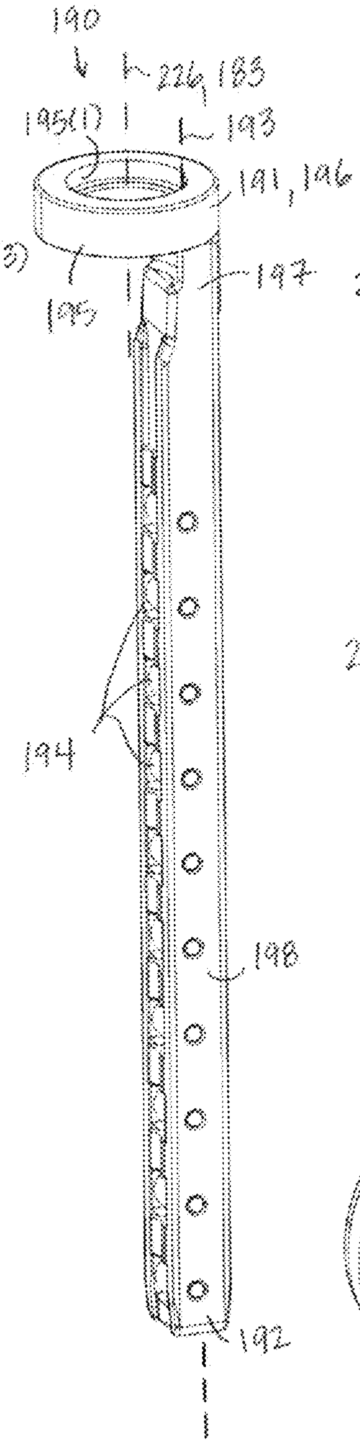
FIG. 13 is a perspective view of the lifter.
Figure 14:
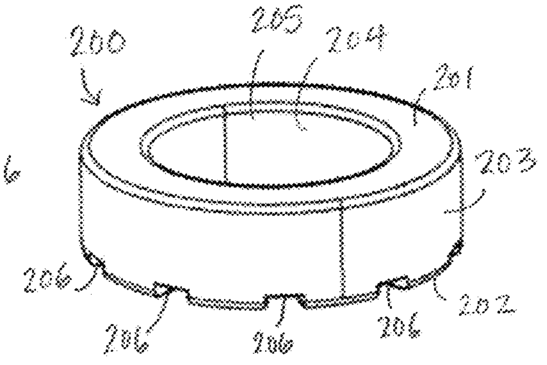
FIG. 14 is a perspective view of the jam bumper.
Figure 15:
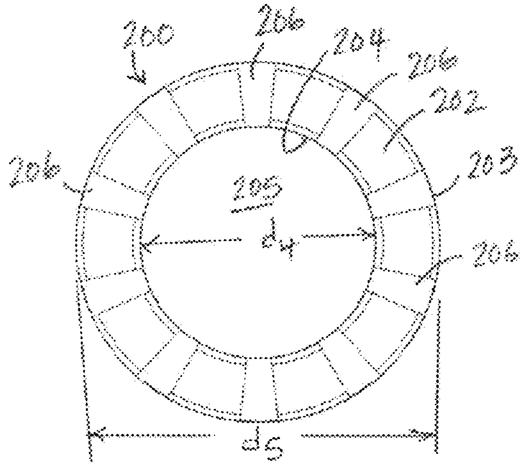
FIG. 15 is a bottom plan view of the jam bumper.
Figure 16:
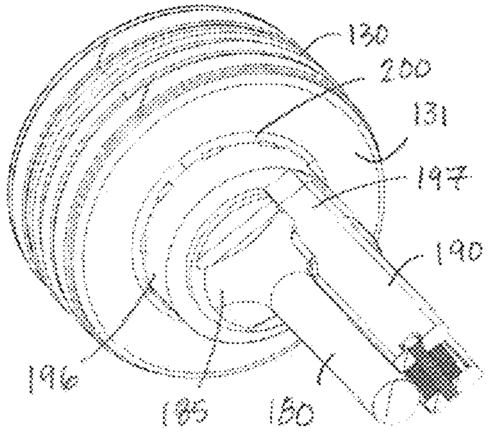
FIG. 16 is a cross-sectional view of the assembly of FIG. 9.

In the event of a nail jam (which is an example of abnormal operation of the nailer 100), one or more forceful collisions of the lifter gear 140 and the lifter 190 may occur. In the event of a forceful collision of the lifter gear 140 and the lifter 190, the jam bumper 200 is axially compressed between the lifter first end 191 and the piston 130 as shown in FIG. 11. The momentary compression of the jam bumper 200 and resulting axial movement of the lifter 190 absorbs the "jam shock" with the shortest possible load path. For example, the piston force is reduced by the jam bumper 200, as the lifter rollers 194 skip relative to the teeth 138 of the lift gear 140. During such an event, the jam bumper lifter-facing surface 202 may momentarily recede below the lifter-facing surface 131 of the piston 130.

In some embodiments, the jam bumper 200 may have some level of preload to maintain contact between the lifter annular body 195 and the shoulder 185(1) of the driver blade 180. However, if the lifting force compresses the jam bumper 200 excessively, accelerated wear can occur.

Each of the cap-facing surface 201 and the lifter-facing surface 202 may be generally planar and free of ridges, bumps, protrusions or channels. However, in the illustrated embodiment, the lifter-facing surface 202 includes surface features that permit tuning of the elastic properties of the jam bumper 200. For example, the lifter-facing surface 202 of the jam bumper 200 includes circumferentially spaced recesses 206, giving the lifter-facing surface a crenellated appearance. By modification of the number, shape and dimensions of the recesses 206, the elastic properties of the jam bumper 200 can be tuned. This tuning can replace, or be used in combination with, other property-tuning methods such as modification of bumper dimensions, material selection, durometer selection, etcetera.

By the above-described configuration, the driver blade 180 and the lifter 190 are each attached to the piston 130 but are not fixed to each other. Instead, the lifter 190 moves independently of the driver blade 180 and is axially moveable relative to both the piston 130 and the driver blade 180 to an extent permitted by the elasticity of the jam bumper 200.

Figure 17:
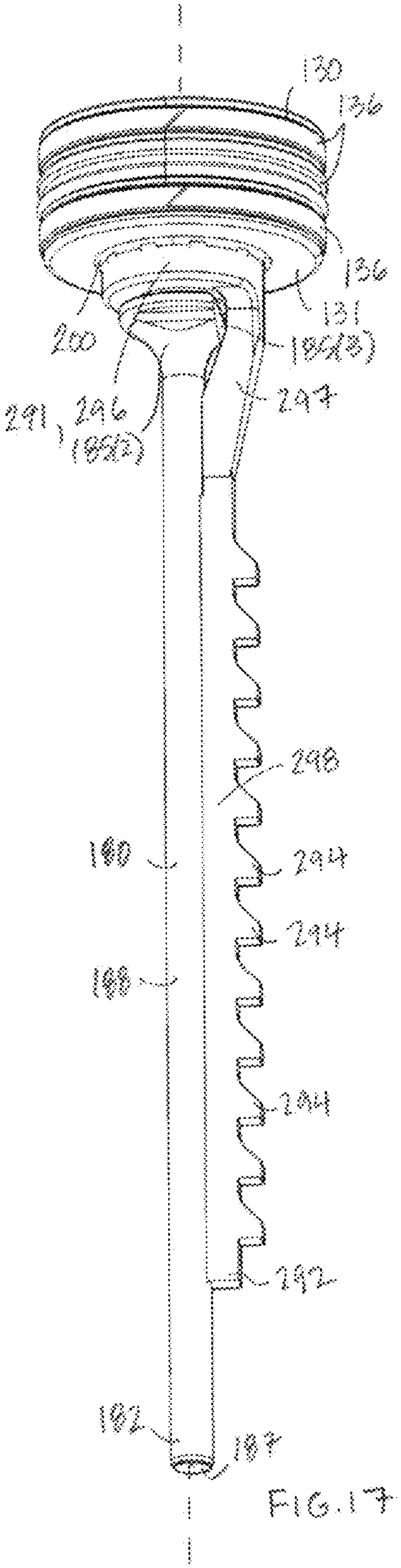
FIG. 17 is a perspective view of the assembled piston, driver blade, alternative embodiment lifter and impact bumper.
Figure 18:
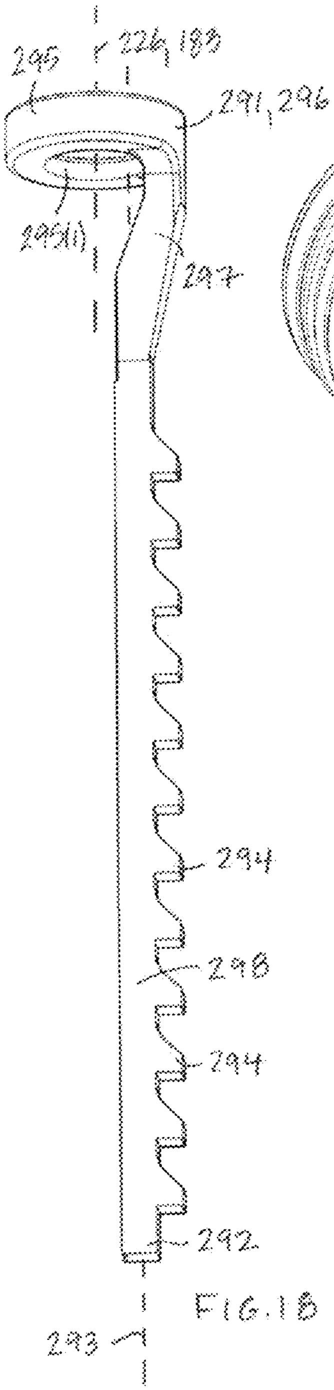
FIG. 18 is a perspective view of the alternative embodiment lifter.
Figure 19:
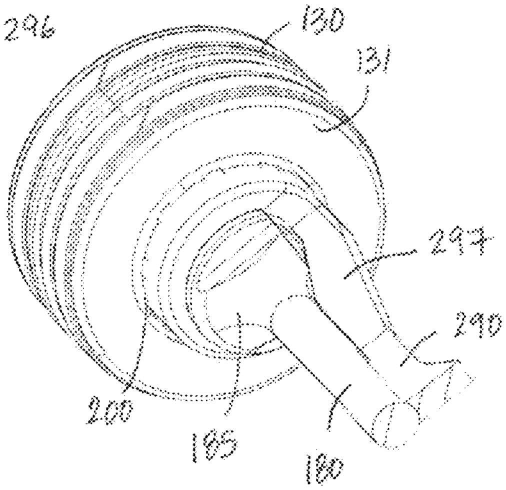
FIG. 19 is a cross-sectional view of the assembly of FIG. 17.

Referring to FIGS. 17-19, the above-described embodiment includes the lifter 290 that employs rollers 194 to engage the teeth 138 of the lifter gear 140. The power tool 100 is not limited to a lifter having rollers. For example, the power tool 100 may employ an alternative embodiment lifter 290 that employs teeth 294 to engage the teeth 138 of the lifter gear 140.

Like the lifter 190 described above, the alternative embodiment lifter 290 is connected to the piston 130 via the jam bumper 200 so as to protrude from the piston lifter-facing surface 131. The lifter 290 is an elongate structure that extends side-by-side with the driver blade 180. The lifter 290 has a lifter first end 291 that is joined to the jam bumper 200, and a lifter second end 292 that is opposed to the lifter first end 291. The lifter 290 includes a lifter longitudinal axis 293 that extends between the lifter first and second ends 291, 292. The lifter longitudinal axis 293 is parallel to, and radially offset with respect to, the blade longitudinal axis 183.

The lifter 290 has a cross-sectional shape and a dimension that varies along the lifter longitudinal axis 293. In particular, the lifter 290 includes a lifter first portion 296 that includes the lifter first end 291 and defines an annular body 295 that encircles the driver blade first end 181 and the piston boss 234. The annular body 295 resides in a plane that is perpendicular to the cylinder longitudinal axis 221 and lifter longitudinal axis 293, and a central opening 295(1) of the annular body 295 is centered on the cylinder longitudinal axis 221. The lifter 290 includes an elongated lifter second portion 298 that includes the lifter second end 292. The lifter second portion 298 is coextensive with the lifter longitudinal axis 293. The lifter second portion 298 defines rack including rack teeth 294 that protrude radially in a direction away from the drive blade 180. The lifter 290 includes a bridging portion 297 that extends between the lifter first and second portions 296, 298. The bridging portion 297 is angled relative to the lifter longitudinal axis 293 so that the lifter second portion 298 at least partially underlies the central opening 295(1).

The lifter 190, which contains a plurality of rollers 194 or teeth 294 is parallel to the driver blade 180 and is offset from the blade longitudinal axis 183 only by the distance required to create a structural column. In some embodiments, the lifter 190 is in direct contact with the driver blade 180, with the driver blade 180 complementing the operating loads of the lifter 190. It is understood that a friction reduction element could be placed between the fixed driver blade 180 and the lifter 190, if the nailer application has a high likelihood of jam shock.

In the above-described configuration, the jam bumper 200 accommodates jam shock in the tool 100. For this reason, both the lifter 190 and driver blade 180 can be optimized for their primary function rather than to accommodate jam shocks. For example, since the tool 100 includes the jam bumper 200 as described, the driver blade 180 may be optimized for fastener impact, while the lifter 190 may be optimized for wear, toughness and column loading. In addition, since the lifter 190 and the driver blade 180 are not integrated and instead are separate structures, only the worn part can be replaced, lowering the total cost of ownership for the end user.

Figure 20:
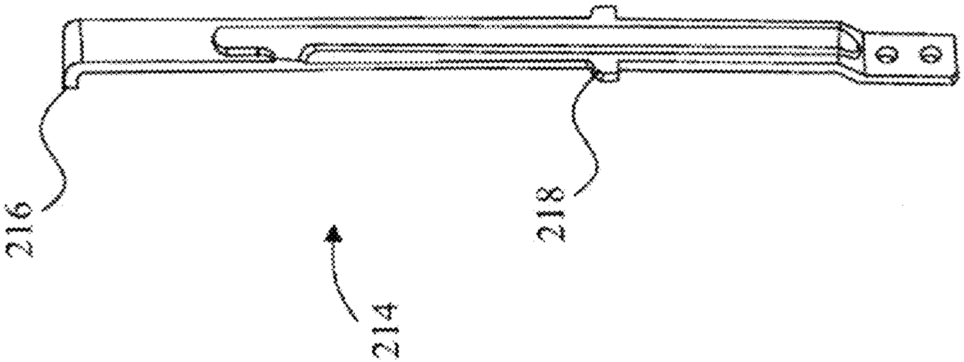
FIG. 20 is a perspective view of the WCE extension of FIG. 3.

Returning to FIG. 3, the WCE assembly 116 includes a nose piece 210, which in this embodiment is the WCE, that is fixedly attached to a WCE stamping 212. A WCE extension 214, also shown in FIG. 20, is attached to the WCE stamping 212 at one end and at the other end includes a bearing portion 216. The WCE extension 214 further includes shoulders 218. The WCE extension 214 is maintained in alignment with a plunger 220 by a pair of guides 222 (also shown in FIG. 2). A WCE spring 224 biases the WCE stamping 212 along the drive axis 226 in a direction away from the WCE extension 214. The shoulders 218 of the WCE extension 214 act as stops with the lower of the two guides 222 to limit downward travel of the nose piece/WCE 210, WCE stamping 212, and WCE extension 214.

As used, herein, “downward” refers to the direction in which a nail (not shown) is driven by the nailer 100 along the drive axis 226, which is in the downward direction in the configuration depicted in FIG. 3. Additionally, for ease of discussion, “movement” of the various components is described herein with reference to the housing 102 of the nailer 100. In particular, under normal operating conditions the WCE 210, the WCE stamping 212, and the WCE extension 214 do not actually move since the WCE 210 is positioned against a work piece. Rather the rest of the nailer 100 is moved to compress the WCE spring 224. Nonetheless, the WCE 210, the WCE stamping 212, and the WCE extension 214, along with other components, will be described as “moving” for ease of discussion, it being understood that the “movement” simply refers to movement relative to the housing 102.

Figure 22:
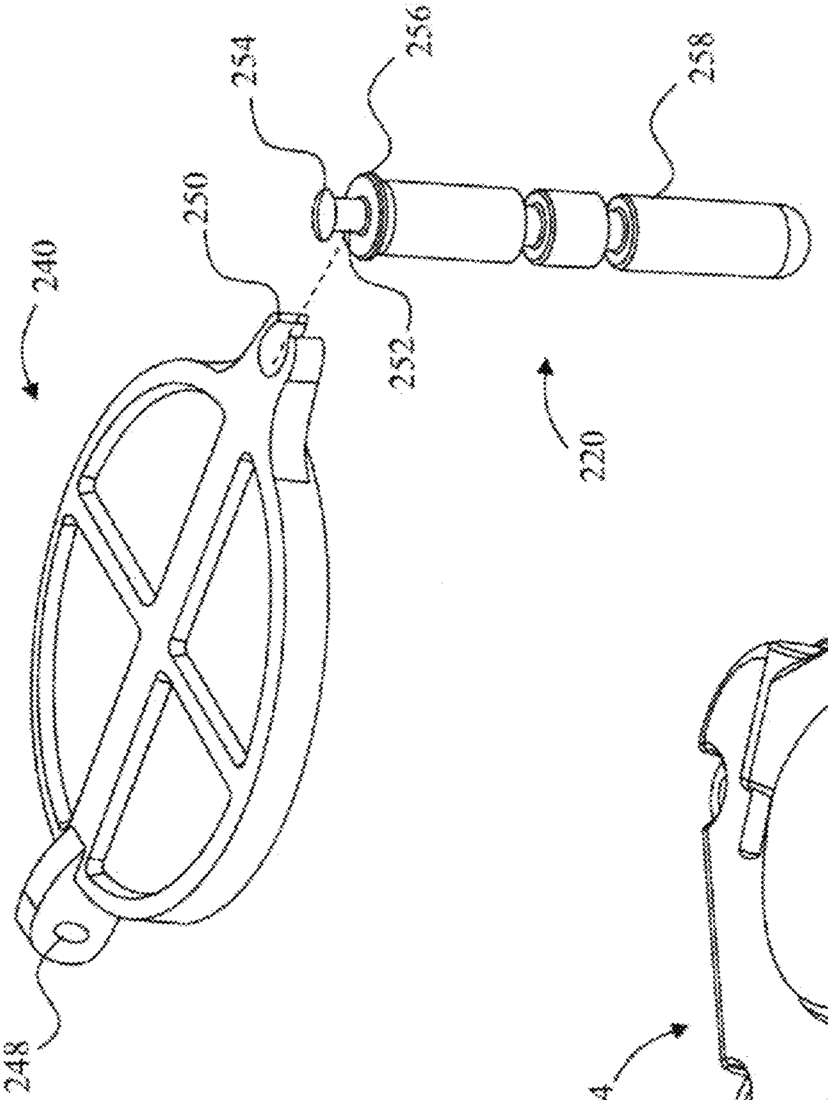
FIG. 22 is a perspective view of the flapper valve and plunger of the nailer of FIG. 1.
Figure 21:
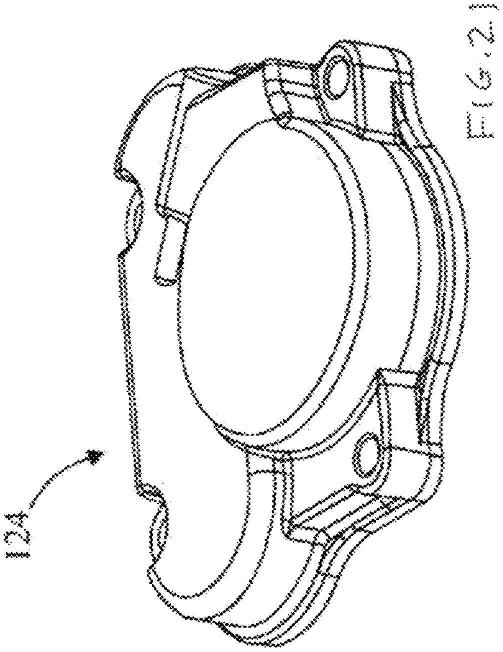
FIG. 21 is a perspective view of the cap of FIG. 3.
Figure 23:
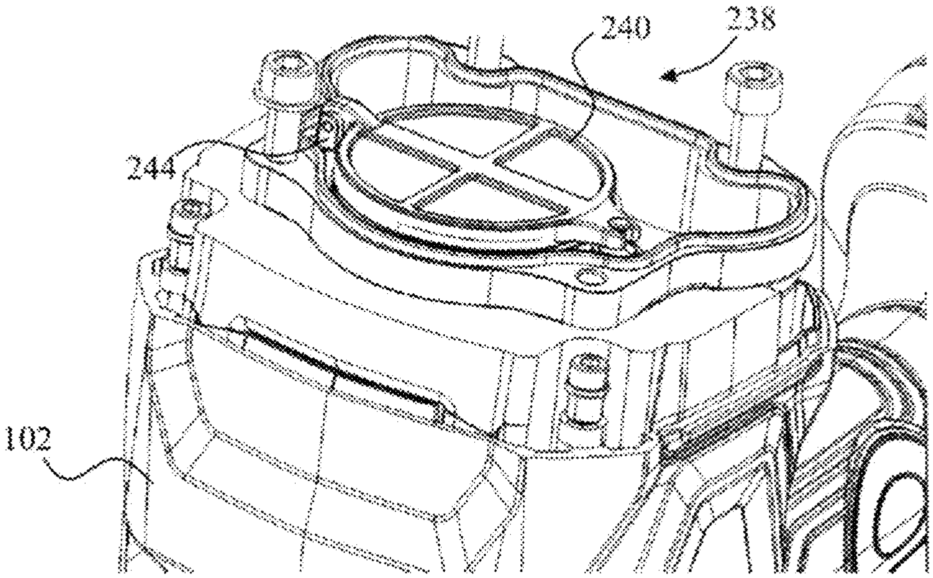
FIG. 23 is a partial perspective view of the nailer of FIG. 1 with a portion of the housing and the cap removed to show the location of the head valve assembly.
Figure 24:
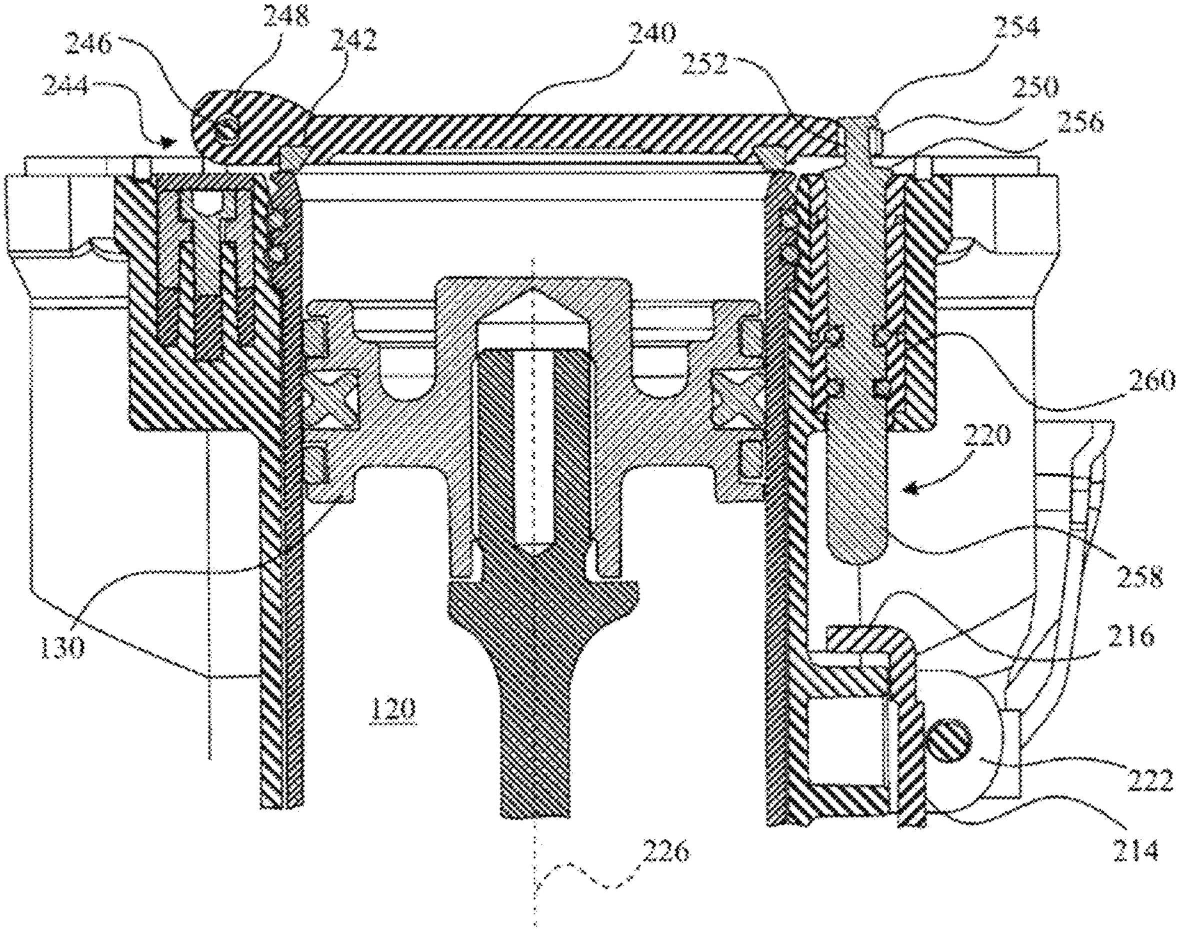
FIG. 24 is a partial cross-sectional view of the head valve assembly and air cylinder of the nailer of FIG. 1 with the flapper valve in a non-firing position.

Returning to FIG. 1, a portion of the housing 102 is removed as is the cap 124 (see FIGS. 2 and 21) to reveal a head valve assembly 238 which is also shown in FIGS. 22-24. The head valve assembly 238 includes a flapper valve 240 which has a seal 242, the plunger 220, and a pivot 244. The pivot 244 includes a circular pin 246 that fits within an oval pivot bore 248 of the flapper valve 240. The flapper valve 240, which can seal the headspace 118, and thus the accumulator 122, from the cylinder 120, includes a pair of fingers 250 that receive a neck portion 252 of the plunger 220.

The neck portion 252 is located between a head 254 and shoulder 256 of the plunger 220. The neck portion 252 is configured to slide between the fingers 250 from the side (i.e., in a direction orthogonal to the drive axis 226), while the head 254 and the shoulder 256 are sized to not pass through the fingers 250 in directions along the drive axis 226. In some embodiments the neck portion is circular in cross section. In other embodiments the neck portion is configured to allow insertion into the fingers in one orientation, while preventing insertion (or removal) when rotated to a different orientation.

A shaft portion 258 of the plunger 220 extends outwardly of the headspace 118 in an airtight but slidable manner through an insert 260. The shoulder 256 of the plunger 220 is configured to abut the insert 260, which is fixedly positioned in the nailer 100, in a non-firing configuration as depicted in FIG. 24.

Operation of the nailer 100 is described with initial reference to FIG. 24. In the configuration of FIG. 24, the piston 130 is at is full upward position within the air cylinder 120, and is held at this position by the last tooth 138L of the lifter gear 140 (see FIG. 5). In this configuration the air within the upper portion of the air cylinder 120, the headspace 118, and the air accumulator 122 is fully pressurized. The pressure differential between the headspace 118 and atmosphere acts across the plunger 220 biasing the plunger 220 downwardly along the drive axis 226 thereby forcing the shoulder 256 of the plunger 220 against the insert 260.

Because the head 254 of the plunger is larger than the opening defined by the fingers 250 of the flapper valve 240 (in a plane orthogonal to the drive axis 226), the flapper valve 240 is maintained in a non-firing position, and hence the seal 242, is held firmly against the upper portion of the air cylinder 120 thus sealing the air cylinder 120 from the headspace 118. In some embodiments, the pivot bore 248 is circular, which creates a tight seal around the entire circumference of the seal 242. In the embodiment of FIG. 24, the pivot bore 248 is oval with the major axis extending along the drive axis 226 and positioned to have the pin 246 centrally located when the shoulder 256 is resting against the insert 260. Consequently, the force of the seal 242 against the air cylinder 120 is reduced at locations proximate the pivot 244. The reduced force reduces frictional forces introduced between the seal 242 and the air cylinder 120 which must be overcome when actuating the WCE assembly, allowing the WCE actuating force (described below) to be dominated by forces from the WCE spring 224 and forces resulting from the pressurized air in the headspace acting against the plunger 220 as discussed in further detail below.

The reduced force of the seal 242 against the air cylinder 120 may result in some initial leakage past the seal 242 in the event the air in the headspace 118 is at a higher pressure than the air in the air cylinder 120, but such leakage does not significantly affect the safety performance of the head valve assembly 238. In particular, in the event the piston 130 is inadvertently released from the last tooth 138L, for example, due to a mechanical or electrical fault, the compressed air in the volume of the air cylinder 120 above the piston 130 will force the piston 130 to begin to move downwardly. The area in the air cylinder 120 above the piston thus depressurizes rapidly.

The pressure in the headspace 118 does not, however, depressurize as rapidly (if at all) since the flapper valve 240 is in a non-firing position which hinders passage of air from the headspace 118 to the air cylinder 120. Thus, the pressure differential across the flapper valve 240 quickly fully seals the flapper valve 240 even if some leakage initially occurs. Thus, the air in the headspace 118, and the air in the air accumulator 122 is not allowed to pass freely into the air cylinder 120. Accordingly, the piston 130 is driven with a substantially lesser force than during normal operation. This safety feature is provided by flapper valves which are initially tightly seated, flapper valves which are initially not tightly seated, and flapper valves which allow some leakage even when tightly seated. In all instances, because the passage of air into the air cylinder is obstructed, the force applied to a fastener is substantially reduced in the event of an inadvertent firing of the nailer 100.

Continuing with the description of normal operation of the nailer 100, with the piston 130 and flapper valve 240 in the configuration of FIG. 24, a user presses the WCE/nosepiece 210 (see FIG. 3) against a workpiece (not shown) thereby compressing the WCE spring 224 as the WCE stamping 212 and WCE extension 214 move upwardly, with respect to the housing 102, along the drive axis 226. This movement continues until the bearing portion 216 of the WCE extension 214 contacts the lower end of the shaft 258 of the plunger 220. At this point, additional force must be applied to provide continued upward movement of the WCE 210, WCE stamping 212, WCE extension 214, and plunger 220.

Specifically, the force required to move the WCE 210 is referred to as the "WCE actuation force". The WCE actuation force is a design choice which takes into account the weight of the tool and provides a safety factor to ensure the operator is actively pressing the WCE against a workpiece to prevent inadvertent firing of the nailer 100. In some instances, the WCE actuation force is desired to be the amount of force provided by the tool (the weight of the tool at the nose of the tool) plus about 50% of the total weight of the tool. Thus, for a power tool of 10 pounds with an even weight distribution between the nose and the rear of the tool, the force provided by the tool is about 5 pounds force and the additional 50% requires another 5 pounds force for a total of 10 pounds force.

With respect to the nailer 100, the WCE actuation force is initially established primarily by the counter force of the WCE spring 224 with some negligible friction forces, and is thus a function of the spring constant of the WCE spring 224. Thus, the WCE actuation force is initially simply the force needed to overcome the WCE counter-force of the WCE spring 224. Once the bearing portion 216 contacts the plunger 220, however, the force of the pressurized air in the headspace 118 against the plunger 220 must also be overcome. This force is a function of the pressure in the headspace 118 along with the diameter of the plunger. By forming the pivot bore 248 as an oval as described above, frictional forces associated with the seal 242 and air cylinder 120 are significantly reduced. Moreover, because the frictional forces between the seal 24 and the air cylinder 120 are significantly reduced, moving the flapper valve 240 does not introduce significant torque on the plunger 220, thereby minimizing friction associated with movement of the plunger 220.

Therefore, since the pressure in the head valve is a design parameter which is determined based upon the force needed to drive the fastener, the main determinants of the actuation counter-force are the spring constant of the WCE spring 224 and the diameter of the of the plunger 220.

Thus, the WCE spring 224 spring constant and the diameter of the plunger 220 can be selected to provide a desired WCE actuation force profile. In one embodiment, the spring constant and the plunger diameter are selected such that the WCE spring 224 and movement of the plunger 220 each account for about 50% of the actuation counterforce as the flapper valve 240 moves into a firing position. In other embodiments, different actuation counter-force profiles are provided.

Figure 25:
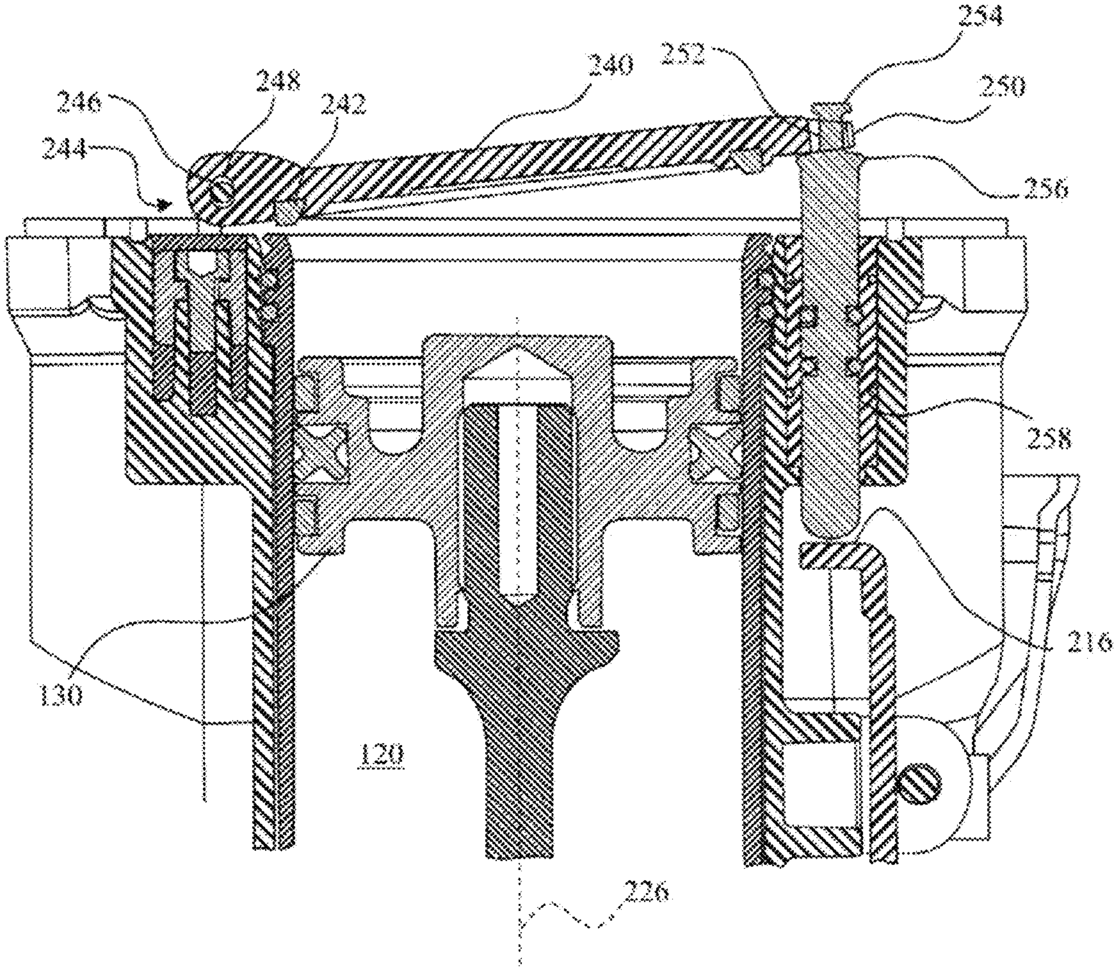
FIG. 25 is a partial cross-sectional view of the head valve assembly and air cylinder of the nailer of FIG. 1 with the flapper valve in a firing position.

Continued application of the WCE actuation force moves the plunger 220 to a firing position as depicted in FIG. 25. In the configuration of FIG. 25, a continuous air path is provided between the air accumulator 122 and the air cylinder 120 through the headspace 118. As shown in FIG. 25, the opening defined by the fingers 250 is larger than the diameter of the neck portion 252, allowing the flapper valve 240 to pivot about the pivot pin 246 without torquing the plunger 220 and/or creating significant friction.

A sensor (not shown, typically a Hall sensor) senses the position of the WCE 210, either directly or indirectly, such as by sensing the WCE stamping 212 or the WCE extension 214 and sends a signal to the PCBA 126 indicating that the WCE 210 has been depressed sufficiently to allow for firing of the nailer 100. A signal indicating depression of the trigger is also sent to the PCBA 126. With the flapper valve in the firing position and the trigger depressed, the PCBA 126 "fires" the nailer by energizing the motor 128 thereby rotating the hub 146 in the direction of the arrow 276 in FIG. 3.

As the lifter gear 140 rotates in the direction of the arrow 276, the last tooth 138L is forced out of engagement with the bottom roller 194 in the lifter 190 allowing compressed air entrapped in the cylinder 120 above the piston 130, as well as compressed air in the headspace 118 and accumulator 122, to expand thereby forcing the piston 130 along the drive axis 226. The driver blade 180 is then forced against a nail (not shown) forcing the nail into a workpiece (not shown).

Figure 26:
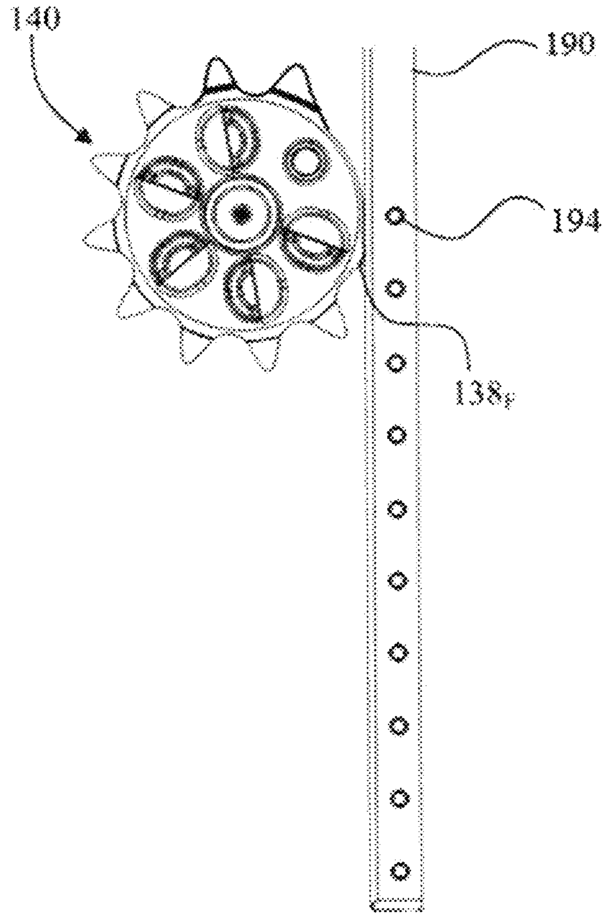
FIG. 26 is a partial front plan view of the lifter gear and lifter of the power tool of FIG. 1 with the first tooth of the lifter gear engaged with the top roller of the lifter.

Once the driver blade 180 has been fully extended, the motor 128 will have rotated the lifter gear 140 so that the first tooth 138F is positioned to engage the first (top) roller as shown in FIG. 26. Continued rotation of the motor 128 results in continued rotation of the lifter gear 140 resulting in the piston 130, and hence the driver blade 180, being lifted to the ready position shown in FIG. 3 by time the motor 128 effects one complete rotation of the lifter gear 140.

Figure 27:
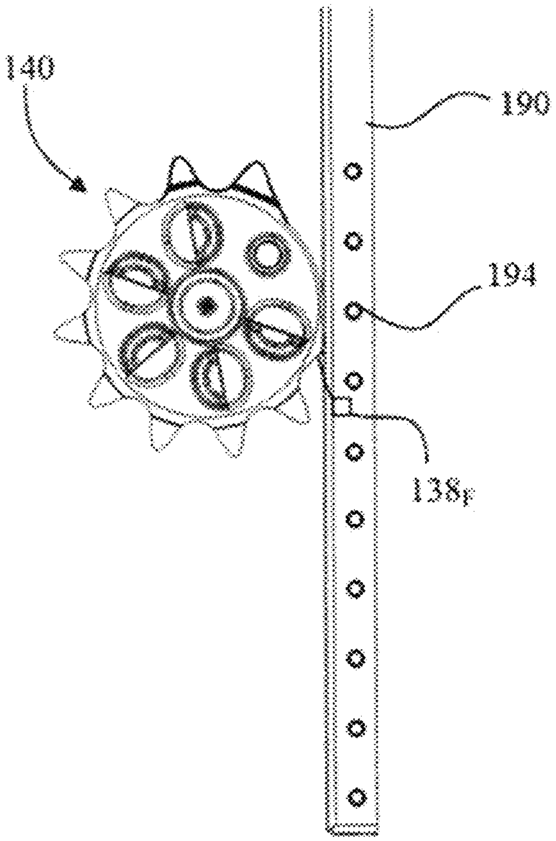
FIG. 27 is a partial front plan view of the lifter gear and lifter of the power tool of FIG. 1 with the first tooth of the lifter gear engaged with the third roller of the lifter.

In the event the driver blade 180 does not fully extend, resulting in the configuration of FIG. 27, then the first tooth 138F will engage a roller 194 other than the first (top) roller 194. In FIG. 27, the first tooth 138F is shown engaging the third roller 194. Continued rotation of the motor 128 in this scenario results in continued rotation of the lifter gear 140 resulting in the piston 130, and hence the driver blade 180, being lifted to the ready position before the motor 128 effects one complete rotation of the lifter gear 140. Consequently, jam shock will occur as the motor 128 continues rotating the lifter gear 140 with the piston 130 at the ready position shown in FIG. 3.

In particular, as the motor 128 continues rotating the lifter gear 140 with the piston 130 at the ready position, the teeth 138 are forced out of engagement with the lifter 190. The flapper valve 240 will still be in the firing position, accordingly, the air in the accumulator 122 is not yet isolated from the air in the cylinder 120. Thus, the compressed air in the cylinder 120, the headspace 118, and the accumulator 122 will force the piston 130, and hence the lifter 190, along the drive axis 226 as a following tooth 138 rotates into the path of a roller 194 of the lifter 190.

A portion of the force of the impact of the engagement of the tooth 138 with a roller 194 of the moving lifter 190 is transferred to the jam bumper 200 through the contacting portions of the lifter first end 191. The jam bumper 200 thus absorbs at least a portion of the force of the impact.

Once the last tooth 138L has engaged the lowest roller, rotation of the motor 128 is stopped. Upon lifting the nailer 100 from the workpiece, the WCE spring 224 forces the WCE 210, the WCE stamping 212, and the WCE extension 214 downwardly along the drive axis 226 until the shoulders 218 of the WCE extension 214 contact the lower guide 222.

The downward movement of the WCE extension 214 allows the compressed air within the headspace 118 to force the plunger 220 outwardly from the headspace 118 in a downward direction along the drive axis 226. The plunger 220 continues to move along the drive axis 226 until the shoulder 256 once again contacts the insert 260. As the plunger 220 moves downwardly, the head 254 contacts the fingers 250 and forces the flapper valve 240 to move from the firing position of FIG. 25 to the non-firing position of FIG. 24. The nailer 100 is thus configured for a subsequent firing operation.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A power tool, comprising:
an air spring cylinder;
a piston movably positioned within the air spring cylinder along a longitudinal axis of the air spring cylinder;
a driver blade fixedly attached to the piston;
a lifter that is attached to the piston via an elastic member;
a lifter gear including a lifter gear wheel portion, and a plurality of teeth extending radially from the lifter gear wheel portion and configured to engage the lifter;
a motor including a motor output; and
a hub including a first end operably connected to the motor output and a second end including a hub wheel portion that is fixed to the lifter gear whereby the motor is configured to lift the lifter via the lifter gear.

2. The power tool of claim 1, wherein
the elastic member is disposed between the lifter and the piston.

3. The power tool of claim 1, wherein
the elastic member is annular and is disposed in an annular groove provided in a lifter-facing surface of the piston.

4. The power tool of claim 1, wherein
a first end of the driver blade is fixed to the piston, and
the elastic member encircles the first end of the driver blade.

5. The power tool of claim 4, wherein
a first end of the lifter is in direct contact with the elastic member.

6. The power tool of claim 1, wherein
an end face of the piston includes a hole,
a first end of the driver blade is received within the hole,
the elastic member is annular, and
the elastic member is disposed in an annular channel that surrounds the blind hole.

7. The power tool of claim 6, wherein
a first end of the lifter has an annular shape that defines a central opening,
the central opening encircles the first end of the driver blade, and
the first end of the lifter is in direct contact with the elastic member.

8. The power tool of claim 1, wherein
the elastic member has surface features configured to tune the elastic properties of the elastic member.

9. The power tool of claim 1, wherein the lifter includes
a lifter first end that is in direct contact with the elastic member,
a lifter second end opposite the first end,
a lifter first portion that includes the first end, the lifter first portion having a lifter central opening that receives the driver blade therein, and
a lifter second portion that includes the lifter second end, the lifter second portion being configured to engage with the teeth of the lifter gear.

10. The power tool of claim 9, wherein the lifter first portion is annular in shape and resides in a plane that is perpendicular to the longitudinal axis of the air spring cylinder.

11. The power tool of claim 9, wherein the lifter second portion includes a plurality of rollers, the rollers being spaced apart along a longitudinal axis of the lifter.

12. The power tool of claim 9, wherein the lifter second portion includes a plurality of lifter teeth, the lifter teeth being spaced apart along a longitudinal axis of the lifter.

13. The power tool of claim 9, comprising a stop bumper that is disposed between the piston and an end of the cylinder, the stop bumper including a stop bumper central opening, wherein the lifter and blade extend through the stop bumper central opening.

14. The power tool of claim 1, comprising a stop bumper that is disposed between the piston and an end of the cylinder, the stop bumper including a stop bumper central opening, wherein the lifter and blade extend through the stop bumper central opening.

15. The power tool of claim 1, wherein
the elastic member is supported by the piston, and
the lifter includes a lifter first end that is in direct contact with the elastic member, a profile of the lifter first end having a shape and dimensions corresponding to the shape and dimensions of a profile of the elastic member.

* * * * *